United States Patent

Ku et al.

[11] Patent Number: 5,881,242
[45] Date of Patent: Mar. 9, 1999

[54] METHOD AND SYSTEM OF PARSING FRAME HEADERS FOR ROUTING DATA FRAMES WITHIN A COMPUTER NETWORK

[75] Inventors: Edward H. Ku, Cary; James Philip Ervin, Raleigh; Douglas Ray Henderson, Raleigh; Richard Colbert Matlack, Jr., Raleigh; Jean Huey Wingler, Apex, all of N.C.

[73] Assignee: International Business Machines Corporation, Armonk, N.Y.

[21] Appl. No.: 780,803

[22] Filed: Jan. 9, 1997

[51] Int. Cl.⁶ .................................................. G06F 13/00
[52] U.S. Cl. .................................................. 395/200.68
[58] Field of Search ................. 364/DIG. 1 MS File, 364/DIG. 2 MS File; 395/200.3, 200.36, 200.37, 200.48, 200.61, 200.62, 200.66, 200.68, 200.69, 200.7, 200.71, 200.72

[56] References Cited

U.S. PATENT DOCUMENTS

| | | | |
|---|---|---|---|
| 3,979,733 | 9/1976 | Fraser | 340/172.5 |
| 5,038,345 | 8/1991 | Roth | 370/94.1 |
| 5,191,582 | 3/1993 | Upp | 370/94.1 |
| 5,251,215 | 10/1993 | Dravida et al. | 370/94.1 |
| 5,469,150 | 11/1995 | Sitte | 340/825.07 |
| 5,781,729 | 7/1998 | Baker et al. | 395/200.6 |
| 5,793,954 | 8/1998 | Baker et al. | 395/200.8 |

OTHER PUBLICATIONS

IBM Technical Disclosure Bulletin, vol. 32, No. 2—Jul. 1989, "Enhanced Connectivity Facilities Frame Builder and Parser".

IBM Technical Disclosure Bulletin, vol. 36, No. 2—Feb. 1993, "Buffer Management Scheme for Gigabit IP Routers".

*Primary Examiner*—Robert B. Harrell
*Attorney, Agent, or Firm*—John J. Timar; Andrew J. Dillon

[57] ABSTRACT

A method of parsing frame headers for routing data frames within a computer network is disclosed. In accordance with the method and system of the present invention, a data frame is first received from a computer network. A frame header of the data frame is then parsed into multiple test units of identical lengths. A test vector is subsequently assigned to each of the test units, wherein each test vector includes a reference pattern field and an action code pointer field. A number of test blocks are constructed by inserting each of the test vectors into a corresponding slot of various test blocks. Finally, a search tree is constructed by utilizing these various test blocks, and each test block is associated with each other test block via the test vectors contained within.

12 Claims, 11 Drawing Sheets

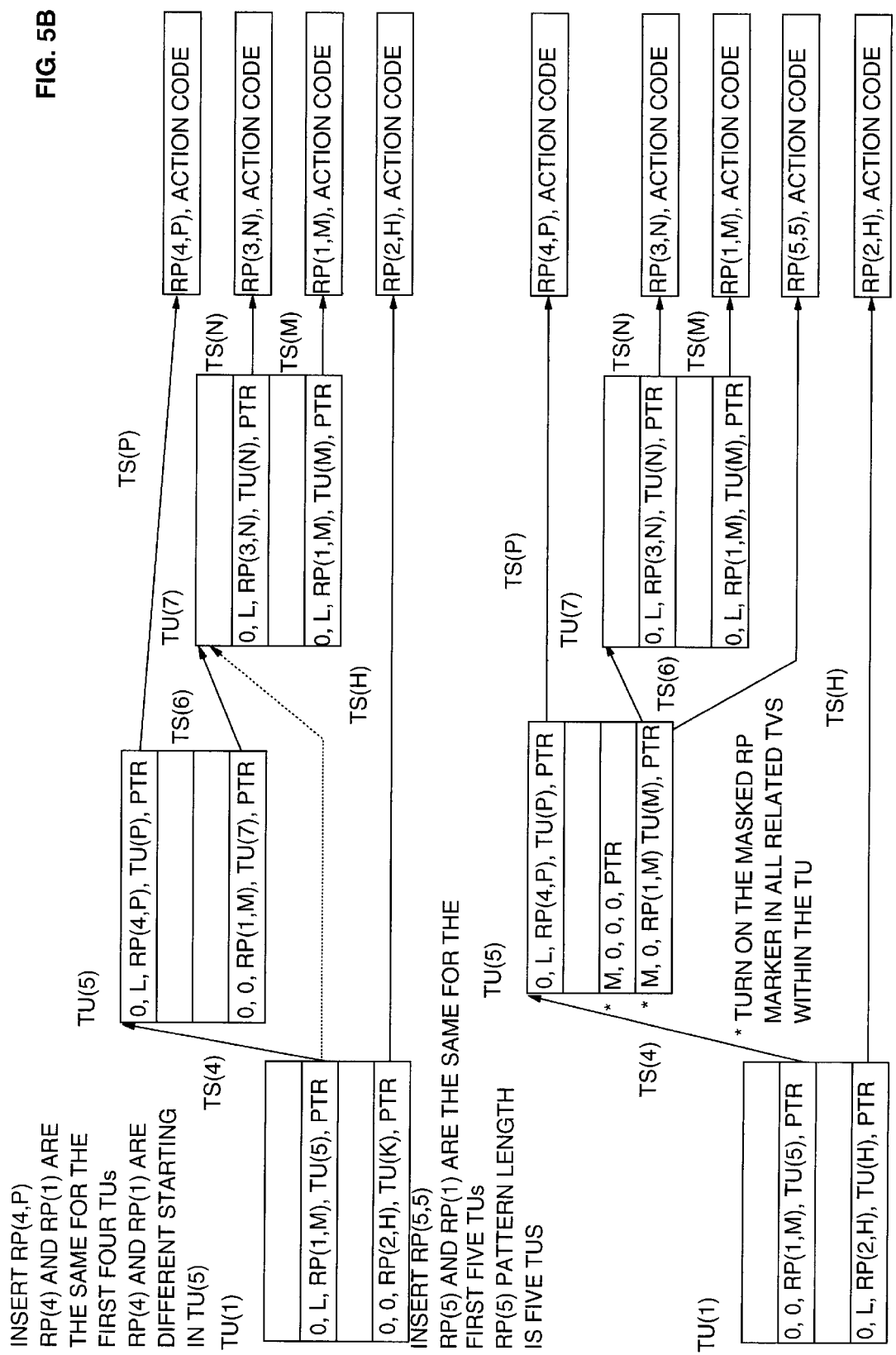

METHOD AND SYSTEM OF PARSING FRAME HEADERS FOR ROUTING DATA FRAMES WITHIN A COMPUTER NETWORK

CROSS-REFERENCE TO A RELATED PATENT APPLICATION

The present invention is related to the subject matter of a co-pending United States Patent Application entitled "Network Bridge/Router," filed Sep. 15, 1994, Ser. No. 08/306,783 (IBM Docket No. RA9-94-011) now U.S. Pat. No. 5,761,440, and assigned to the assignee herein named. The content of the above-mentioned co-pending patent application is incorporated by reference herein.

BACKGROUND OF THE INVENTION

1. Technical Field

The present invention relates to a method and system for data processing in general, and in particular, to a method and system for parsing frame headers. Still more particularly, the present invention relates to a method and system of parsing a frame header for routing data frames within a computer network.

2. Description of the Prior Art

A computer network is a group of computers that are connected by communications facilities for the purpose of providing computer users with an avenue of communicating and transferring information electronically. A computer network can be a local-area network (LAN) consisting of only a few computers within a small area, or it can be a wide-area network (WAN) consisting of many computers distributed over a vast geographical area.

A router (or bridge) is an intermediary device for expediting message delivery within a computer network. Within a LAN, a router receives messages and forwards them to their correct destinations via the most efficiently available route. Within a WAN having several interconnected sets of LANs, a router serves a somewhat different function by acting as a link among these several sets of LANs, enabling messages to be sent from one set of LANs to another.

Various computers within a network computer are coupled to a router through its ports (i.e., locations for passing data in and out of a data-processing device). As a router receives a data frame from one computer intended for another computer(s) within a computer network, the router compares the destination address (address of the receiving computer) provided within the data frame to a stored address/port list. This address/port list indicates which port(s) within the router is associated with the receiving computer(s). The router then directs the data frame to the appropriate port(s) coupled to the receiving computer(s).

Under prior art, an address/port list may be provided to a router beforehand, or the router may develop the address/port list on a dynamic basis. Such address/port lists are stored within the router and are accessed upon the receipt of a data frame. The router then compares the destination address of the data frame to each item within the address/port list until a match is obtained. Generally, each new search through the address/port list begins at the "top" of the address/port list and proceeds sequentially through the destination addresses until a match is found. If there are a very large number of destination addresses in the address/port list, communications within the computer network may be slowed down considerably due to this bottleneck at the router.

Consequently, it would be desirable to provide an improved method for parsing frame headers such that data frames can be routed within a computer network in a more efficient manner.

SUMMARY OF THE INVENTION

In view of the foregoing, it is therefore an object of the present invention to provide an improved method and system for data processing.

It is another object of the present invention to provide an improved method and system for routing data packets.

It is yet another object of the present invention to provide a method and system of parsing frame headers for routing data frames within a computer network.

In accordance with the method and system of the present invention, a data frame is first received from a computer network. A frame header of the data frame is then parsed into multiple test units of identical lengths. A test vector is subsequently assigned to each of the test units, wherein each test vector includes a reference pattern field and an action code pointer field. A number of test blocks are constructed by inserting each of the test vectors into a corresponding slot of various test blocks. Finally, a search tree is constructed by utilizing these various test blocks, and each test block is associated with each other test block via the test vectors contained within.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

The present invention may be implemented in a variety of computers that utilize data packets for external communications within a computer network. Such a computer may be a personal computer, a mini-computer, or a mainframe computer. The computer network may be a local-area network (LAN) or a wide-area network (WAN).

In the following description, numerous specific details are set forth such as word lengths, byte lengths, etc., are set forth to provide a thorough understanding of the present invention. However, it will be obvious to those skilled in the art that the present invention may be practiced without such specific details. In addition, well-known circuits are shown in block diagram form such that the present invention will not be obscured by unnecessary details. Furthermore, details concerning timing considerations and the like have been omitted inasmuch as such details are within the skills of those who are ordinarily skilled in the relevant art and are not necessary for obtaining a complete understanding of the present invention.

Figure 1:
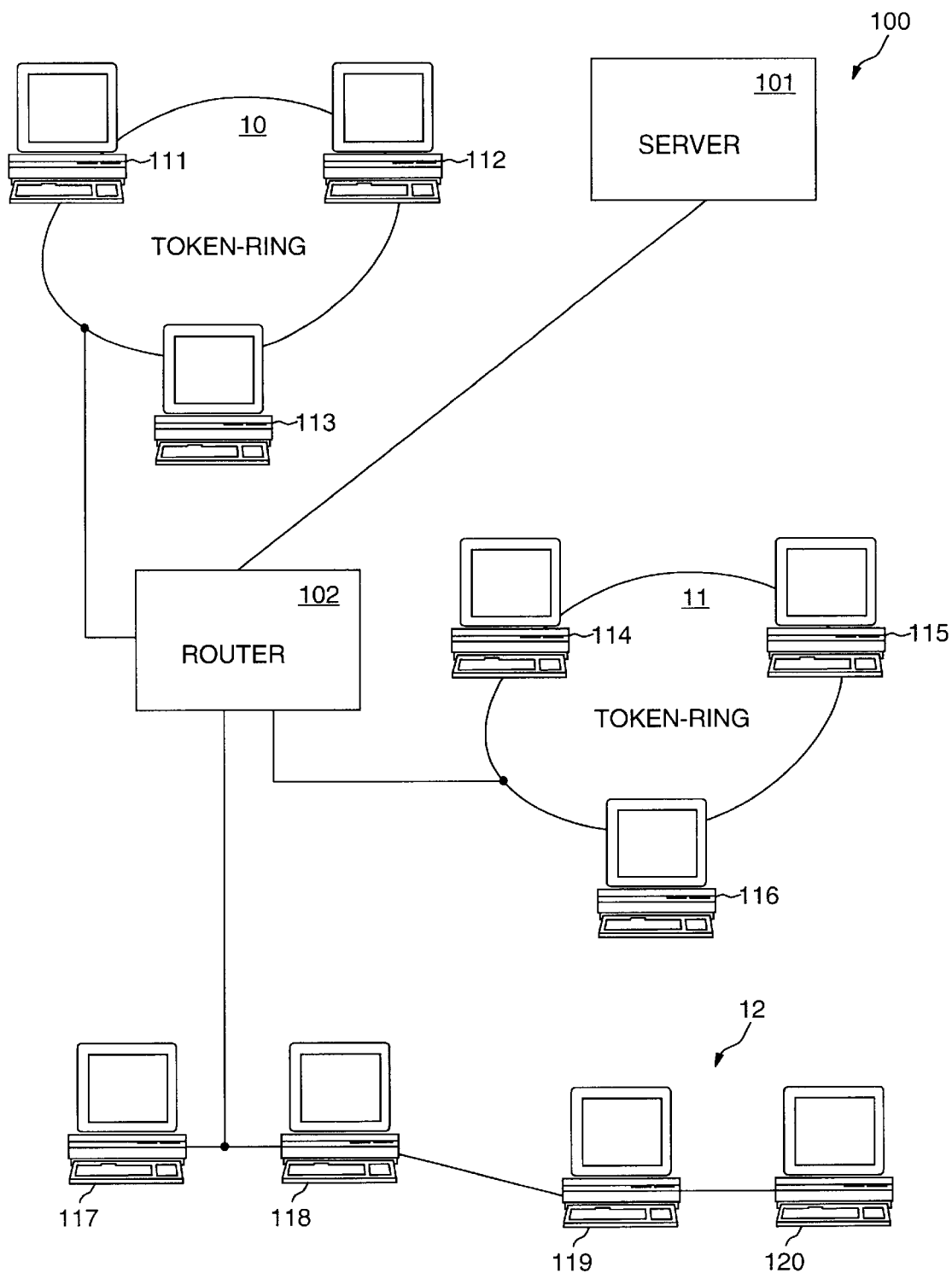
FIG. 1 is a block diagram of a representative computer network in which the present invention may be utilized.

Referring now to the drawings, and specifically to FIG. 1, there is illustrated a block diagram of a representative computer network 100 in which the present invention may be utilized. As shown, LAN 10, LAN 11, and LAN 12 are interconnected to server 101 via router 102. LAN 10 includes nodes 111–113, LAN 11 includes nodes 114–116, and LAN 12 includes nodes 117–120. As each node within the LANs intends to communicate with each other within computer network 100, router 102 facilitates such communications by efficiently directing the communicated data-in the form of packets-to an appropriate destination node of a corresponding LAN. For example, if node 114 of LAN 11 desires to send a data frame to node 120 of LAN 12, node 114 will transmit such data frame to router 102, along with a Destination Address that is associated with node 120, then router 102 will compare the Destination Address received with the data frame from node 114 to a list of addresses/ports within its memory, and subsequently sends the data frame to node 120 upon acquiring a match between the Destination Address and one of the address/port pairs listed within its memory.

Figure 2:
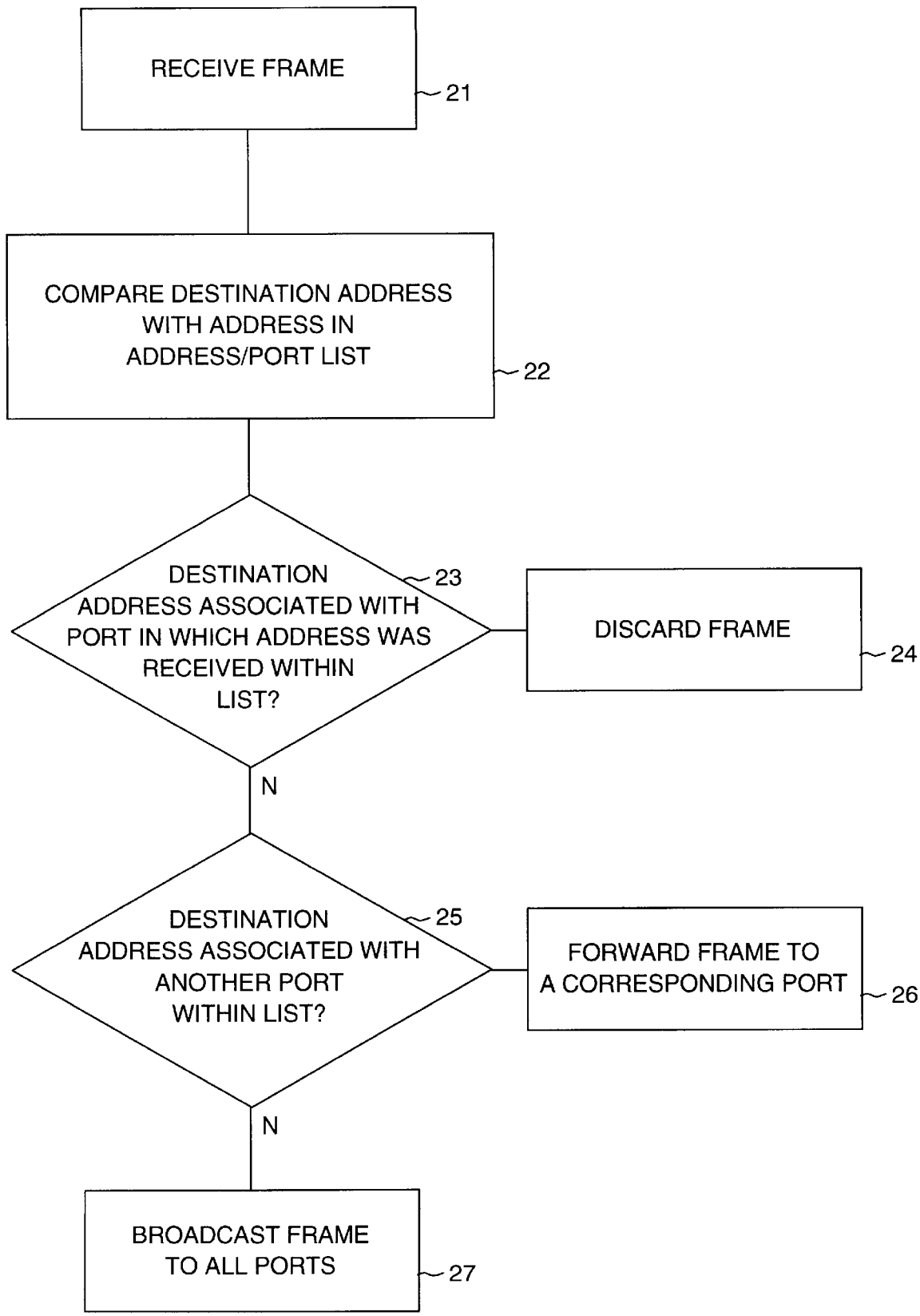
FIG. 2 is a high-level logic flow diagram of a prior-art method for routing data frames within the network of FIG. 1.

With reference now to FIG. 2, there is illustrated a high-level logic flow diagram of a prior-art method for routing data frames within the computer network of FIG. 1. At step 21, one or more data frames are received by the router from one of the various nodes within the computer network. Next, at step 22, the router compares a Destination Address transmitted along with the one or more data frames to all the addresses within the address/port list that is developed by the router and stored within the router. At step 23, the router determines whether or not the Destination Address is associated within the address/port list with the same port on which the Destination Address of one or more data frames were received. If yes, then there is no reason to route the data frames, because they are intended for the same node that transmitted the data frames. As a result, in step 24, the router discards the received data frames.

However, if the Destination Address is not associated with the same port on which it was received, then at step 25, the router determines whether or not the Destination Address is associated with another port within the address/port list. If yes, at step 26, the router then forwards the received data frames to the corresponding port. If the Destination Address is not associated with another port, then the router broadcasts the received data frames to all the ports, as illustrated in step 27.

As discussed above, a address/port list has traditionally been produced as a sequential list of addresses associated with corresponding router ports. With such traditional address/port list, if the router were to perform steps 23 and 25, then the Destination Address received would be compared to each and every address within the address/port list until a match is found. If the number of nodes within the computer network is quite large, such a search would require a considerable amount of time. The worst case associated with this search method would occur if a match is not discovered until the last item within the address/port list produces a match, or if no match is found, resulting in a broadcast of the received data frames.

The present invention provides a more efficient address-searching technique by storing addresses/ports within one or more search trees. These search trees are built with a multiple of bit groups originated from the partitioning of received addresses. Thus, a search is performed by partitioning a received address (from the frame header of an incoming data frame) into bit groups and sequentially comparing these bit groups with various nodes of a search tree. During the search process, a leaf within the search tree may be reached without acquiring an exact match between the received address and the entries of the search tree. In such a case, if the received address is a Source Address, the search tree will be extended utilizing the bits from the Source Address. This process is referred to as "learning" or "entry update." However, if the received address is a Destination Address, then it is determined that there is no exact match within the search tree for the Destination Address and a broadcast of the data frame associated with the Destination Address is performed.

As a preferred embodiment of the present invention, a Reference Pattern (RP) is a pattern of bits to be learned (for adding to an RP pool) or to be deleted (for deleting from the RP pool). The RP bits are divided into a number of Test Units (TUs). The number of bits contained within each TU is predefined, depending on the preferred resolution of the search tree. Each TU is numbered according to its relative location within a RP. A Test Block (TB) is a unit that is utilized to hold the search path information. Each TB holds a set of test vectors (TVs) and the number of TVs contained within a TB is determined by the size of the TU employed. A TV holds the required information for the pattern search, such as a pointer to the next TB, a TU number to be utilized for the next search step, a RP to be matched for continuation of the search, flags and action code pointer of a masked RP to be matched thus far, etc. During a pattern search, the RP bits of a specific TU determine which of the TVs in a TB should be utilized to continue the search.

As a masked IP address, an RP can be of any length up to the size of a Destination Address. For example, if the Destination Address is 4 bytes (32 bits) long, then the RP can be any number of bits up to 32 bits long. In addition, the number of TUs per RP depends on the predefined TU size. Thus, for a 32 bits long RP, if the predefined TU is one bit long, then the RP can be divided into 32 TUs. However, if the predefined TU is two bits long, then the RP can only be divided into 16 TUs. Continuing with the example, if a one-bit TU is utilized, then there is only two TVs in a TB; while if a two-bit TU is utilized, then there are four TVs in a TB. A two-bit TU is preferably chosen for illustrating the present invention, and thus there are four TVs per TB throughout the rest of the disclosure.

Test Vector Descriptions

Figure 3:
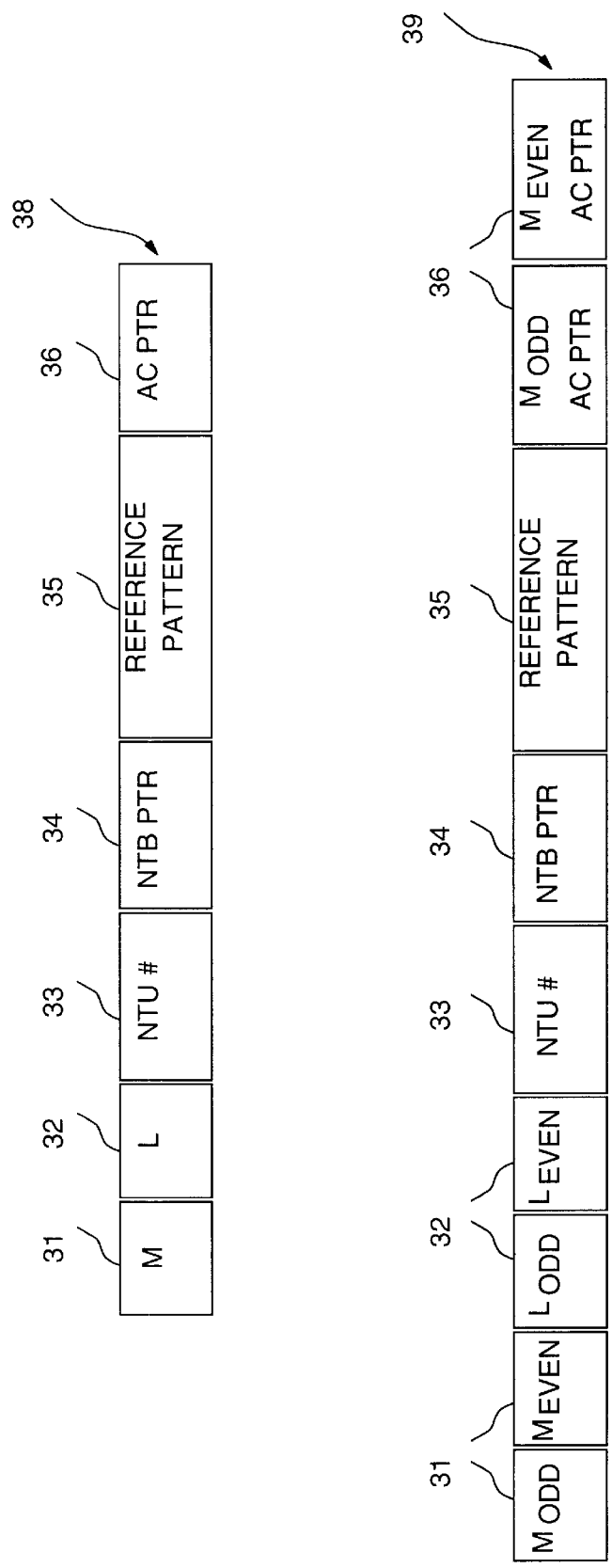
FIG. 3 is a block diagram of two test vectors in accordance with a preferred embodiment of the present invention.

Referring now to FIG. 3, there is illustrated a block diagram of two test vectors in accordance with a preferred embodiment of the present invention. Test vector 38 is utilized in conjunction with a one-bit TU while test vector 39 is utilized in conjunction with a two-bit TU. As shown, both test vectors 38, 39 that are utilized within a search tree have similar fields. Masked Reference Pattern Marker (M) field 31 is utilized to determine if a matched RP is present at this test location. During the learning process, M field 31 is set whenever an RP ends at this test unit. For each marked flag, there is a corresponding action code pointer located in an "Mx AC ptr" field, that points to the location of the matched RP's action descriptors. During the pattern search (pattern matching process), whenever an M-flag is detected, the test vector's address and its M-flag will be saved. At the end of the pattern search, these saved addresses and flags may be utilized to backtrack their corresponding action code pointers for frame modifications and re-transmission processes. The number of bits in M field 31 is equal to the chosen TU size. As mentioned previously, two possible formats of test vectors are illustrated: a one-bit M field in test vector 38 for a one-bit TU configuration and a two-bit M field in test vector 39 for a two-bit TU configuration (one M bit for identifying odd-bit boundary RP, the other M bit for even-bit boundary RP).

A Last Test Vector (L) field 32 is utilized to identify where the search tree ends (i.e., the last test vector of a search path). The number of bits in L field 32 is also equal to the chosen TU size. In a one-bit TU configuration, only one bit is required in L field 32. In a two-bit TU configuration, two bits are needed in L field 32 (again, one L bit for identifying odd-bit boundary RP, the other L bit for an even-bit boundary RP). During the learning process, an M-flag is utilized to mark the RP if the RP ends at this test block (RP's last TU=CTU#, where CTU# is the current TU utilized as decode to locate a TV in a TB). Otherwise, an L-flag and a NTU# are utilized to mark the RP (if RP is longer than CTU#) and to terminate the search tree. In order to simplify implementation, only one L-flag can be set in a given TV. The search tree will be extended and M-flags will be utilized to mark some of the RPs if more than one RP can be marked with L-flags in a TB. When an L-flag is detected in the TV during the pattern search, the following events occur:

1. A Test Pattern (TP) (ie., a received address) and a Reference Pattern (RP) within a TV are compared, up to the test unit number defined in NTU# field 33 and bit boundary by the L-flag, for an exact match.
2. If the TP and the RP are matched, data in NTB ptr field 34 is assigned as AC ptr field 36.
3. AC pointers of all AC ptr fields 36 are then sorted and passed to a Frame-Processing Unit for further frame processing.

The value in a Next Test Unit Number (NTU#) field 33 holds the length of a bit pattern that needs to be matched between the TP and the RP in a TV. A "0" in NTU# field 33 indicates that a search path has ended. The TV slot is empty, if no M-flag is set within the mapped TV. NTU#=CTU# indicates that this is the last TV in a search path. Either the M-flagged RP or L-flagged RP or both must exist in this mapped TV. NTU#>CTU# and no L-flag is set indicates that this mapped TV is a potential test node for the search to continue. All the bits, between the TP and the RP within the length of TU(NTU#−1), i.e., TP is longer than the TU(NTU#−1), need to be exactly matched in order for the search to continue. Otherwise, the search path has ended. NTU#>CTU# and one of the L-flags is set indicates that this is the last TV in a search. When a L-flag is set, all the bits defined by the TU(NTU#) and the L-flag, between the TP and the RP, must be exactly matched to qualify as an RP found.

The value in NTB ptr field 34 is utilized as the base address for the next TB. The TP's TU(NTU#) bit pattern is utilized as an offset to locate the next TV for continuing the pattern search. If L-flag is set, NTB ptr field 34 holds the matched RP's Action Code pointer. If no L-flag is set, the NTB ptr holds the address pointer of the next TB.

Reference Pattern (RP) field 35 holds an RP that is utilized for bit comparison during the pattern search. For each M-flag in a TB, it has a corresponding Action Code pointer stored in a Matched Action Code pointer (Mx AC ptr) field 36.

As a preferred embodiment, when an incoming test pattern (TP) (i.e., received address) arrives, the length and the bit pattern of the TP are presented to a Pattern Match Engine. The Pattern Match Engine utilizes the TP bits and Test Vectors to step through a search tree for locating a matching RPs. Both the Test Vector information obtained from the search tree and the TP bits (in the form of TUs) are utilized to determine the continuation of the RP search. All the matched RPs along with the search path and their corresponding action code pointers are temporarily stored. They will be utilized at the end of the pattern search for frame processing.

Reference Pattern Learning Process

A Test Vector (TV) within a Test Block (TB) holds the information that links all the TBs together to form various search paths. The Matched Action Code pointer (Mx AC ptr) field in a TB is utilized to store the action code locations for all M-flagged RPs in the TB.

When an incoming test pattern (TP) arrives for RP searching, a pattern match engine utilizes the RP bit pattern and the starting point of the search tree to step through the search path. During the pattern search, the matched RPs (flagged by M or L flag(s) in the TVs along the search path) are recorded. At the end of the pattern search, the recorded RPs' information is passed to a Frame-Processing Engine for frame filtering or modifications and re-transmission.

As mentioned above, TBs are utilized for building search trees. During the RP learning process, when a new RP arrives, the first step is to do a search and see if this "new" RP already exists in the RP pool. Once the search is completed, and if a matched RP was found, only the matched RP's action code needs to be updated. Otherwise, the search tree is extended to have the new RP and its action code included. The last TB to be examined before ending the search holds the necessary information for the new RP inclusion.

Each TB is an information block that records the search tree paths and the parameters (such as action code pointer, length, etc.), of all the RPs learned. To record n numbers of RPs, a maximum number of TBs, max_TB, are required, as follows:

$$max\_TB = (n-1) * TB + (start\ TB)$$

A TB that is not utilized to form the search tree is a "free" TB. All the "free" TBs are linked together to form a free TB chain. The RP Update engine can obtain TBs as needed from a free TB pool, during the learning. (The NTU ptr of the first TV in a free TB could be utilized as the pointer to link the free TBs (points to the next free TB)). The "head" and the "tail" of the free TB chain is recorded in a fixed location. Each time a free TB is taken, the "head" pointer will be updated. Also, when a TB (from the RP deletion process) becomes free, the free TB will be linked to the tail of the free TB chain, and the "tail" pointer will be updated.

Figure 4:
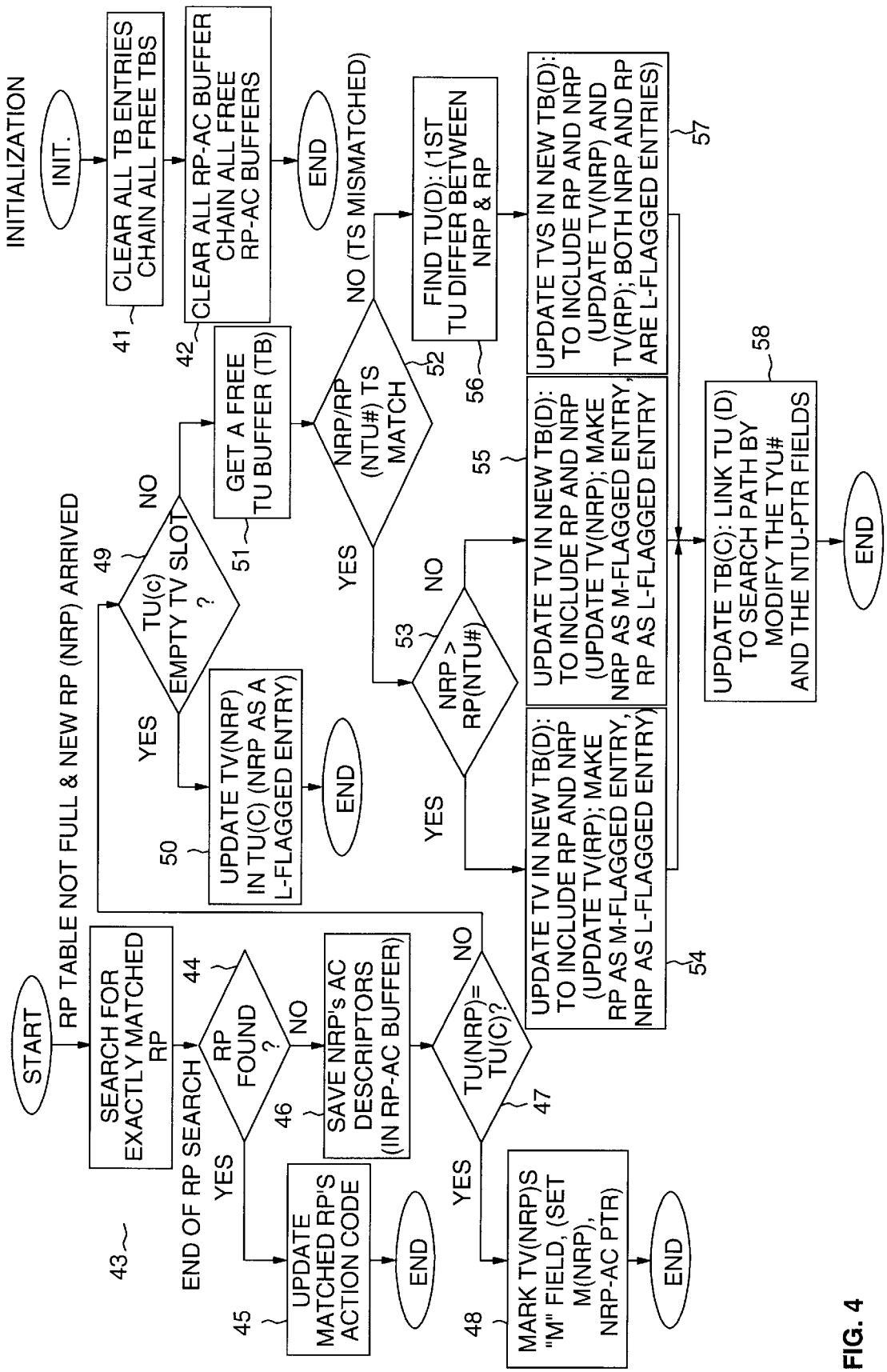
FIG. 4 is a high-level logic flow diagram of a method for learning reference patterns in accordance with a preferred embodiment of the present invention.

With reference now to FIG. 4, there is illustrated a high-level logic flow diagram of a method for learning reference patterns in accordance with a preference embodiment of the present invention. Initially, all TVs in the free TBs are cleared and all the free TB entries are chained together, as shown in step 41. Further, all the RP-AC buffer are cleared, and all the free RP-AC buffers are also chained together, as depicted in step 42. This completes the initialization process such that the method for learning reference patterns can begin.

When an incoming new RP (NRP) arrives, and the RP pool is not full: A search is made for an exactly matched RP, as shown in step 43. A search ends when one of the following conditions occurs:

1. RP located, or
2. No RP found, NRP pattern ended at the last (current) TB (TU(NRP) =CTU#) to be examined, where CTU# is the last (current) TB TU# tested before ending the search, or
3. No RP found, TV(NRP) mapped into an "empty" TV slot in a TB and TU(NRP)>CTU#, or
4. No RP found, RP is a subset of NRP (NRP longer than the RP), or
5. No RP found, NRP is a subset of RP (NRP shorter than the RP), or
6. No RP found, NRP and RP(NTU#−1) bit pattern mismatched.

Then, a determination is made as to whether or not an RP is found, as shown in step 44. If an RP is found, the matched RP's action code descriptors are replaced with the NRP action code descriptors, as depicted in step 45, and this concludes the learning process.

However, if an RP is not found, the NRP's action code descriptors are saved by getting a RP-AC buffer (from RP-AC buffer pool), saving NRP AC descriptors in the RP-AC buffer, and saving NRP-AC buffer pointer (NRP-AC-ptr) for the NRP insertion process, as illustrated in step 46. At step 47, a determination is made as to whether or not NRP pattern ended at this point (i.e., TB(TU(NRP)=TU(C). If the NRP pattern has ended, the TV(s) that correlate to the TV(TU(NRP)) is modified by marking the NRP as an M-flagged RP in the TV(s), and storing the NRP-AC-ptr at the appropriate TB location, as shown in step 48. The rest of the fields in TB remain unchanged, and this concludes the learning process.

However, if the NRP pattern has not ended, a determination is made as to whether or not the mapped TV slot is an "empty" slot, as depicted in step 49. If the mapped TV slot is an "empty" slot, the NRP is marked as an L-flagged RP and the TV(NRP) in this TB is updated by setting the TV(TU(NRP))=(0, L(NRP), TU(NRP), NRP-AC-ptr, NRP) and the TV(TU(NRP)) is then written into the mapped empty TV slot, as depicted in step 50. This concludes the learning process.

Otherwise, if the mapped TV slot is not an "empty" slot, a free TB is obtained from the free TB chain, and the free TB "head" pointer (points to the "next" free TB) is updated, and the newly acquired TB's pointer is saved for later NRP insertion process, as illustrated in step 51. Further, a determination is made as to whether or not NRP and RP(NTU#) are subset to each other, as shown in step 52. If NRP and RP(NTU#) are subset to each other, then another determination is made as to whether or not NRP is longer than RP(NTU#), as shown in step 53. If NRP is longer than RP(NTU#), then the new TB is prepared for NRP insertion, as depicted in step 54, by marking RP as M-flagged entry and NRP as L-flagged entry, as follows:

1. TV(TU(RP))=(M(RP), L(NRP), TU(NRP), NRP-AC-ptr, NRP) (depending on the RP pattern bits and TU size, more than one TV may need to be modified for marking the RP as M-flagged entry in the new TB (NTB)) The RP information can be obtained in the TV(TU(RP)) in TB(CTU#).
2. M(RP)-AC-ptr=RP-AC-ptr (can be obtained in TV(TU(RP)) in TB(CTU#)).
3. Let TU(RP)=TU(k).

If NRP is shorter than RP(NTU#), then the NTB is prepared for NRP insertion, as depicted in step 55, by marking NRP as M-flagged entry and RP as L-flagged entry, as follows:

1. TV(TU(NRP))=(M(NRP), L(RP), TU(RP), RP-AC-ptr, RP) (depending on the NRP pattern bits and TU size, more than one TV may need to be modified for marking the NRP as M-flagged entry in the NTB) The RP information can be obtained in the TV(TU(RP)) in TB(CTU#).
2. Update M(NRP)-AC-ptr (can be obtained in TV(TU(RP)) at appropriate MRP-ptr location in NTB.
3. Let TU(NRP)=TU(k).

From step 52, if NRP and RP(NTU#) are not subset to each other, then the lowest-order TU whose bit pattern differs between RP and NRP is found by comparing RP and NRP, locating first TU, say TU(d), differ in bit pattern, as shown in step 56. Further, the NTB is prepared for NRP insertion, as depicted in step 57, by marking the NRP as L-flagged entry and copying the RP(NTU#) information, as follows:

1. TV(TU(NRP(d)))=(0, L(NRP), TU(NRP), NRP-AC-ptr, NRP)
2. TV(TU(RP(d)))=(0, xx, xx, xx, xx)
   RP information can be obtained in the TV(TU(RP(CTU#))) in TB(CTU#) by:
   a. copying the TV(TU)(RP(CTU#)));
   b. masking off the M-flag fields, (M-flags and MRP-AC-ptr field); and
   c. writing to TV(TU(NRP(d))) TV slot in NTB. TV(TU(NRP(d))) is the test vector identified by the NRP's "d" test unit bit pattern.
3. Let TU(d)=TU(k).

Finally, in step 58, the new TB(NTB) is inserted into the search path by modifying the NTU# and NTU-ptr of the TV(TU(RP(CTU#))) in the last TB(TB(CTU#)) executed before ending the search, have it point to the NTB, as in TV(TU(RP(CTU#)))=(xx, L(RP)=0, NTU#=TU(k), NTU-ptr=(new TB ptr), xx), where "xx" are the fields not changed. This completes the learning process.

Figure 5A:
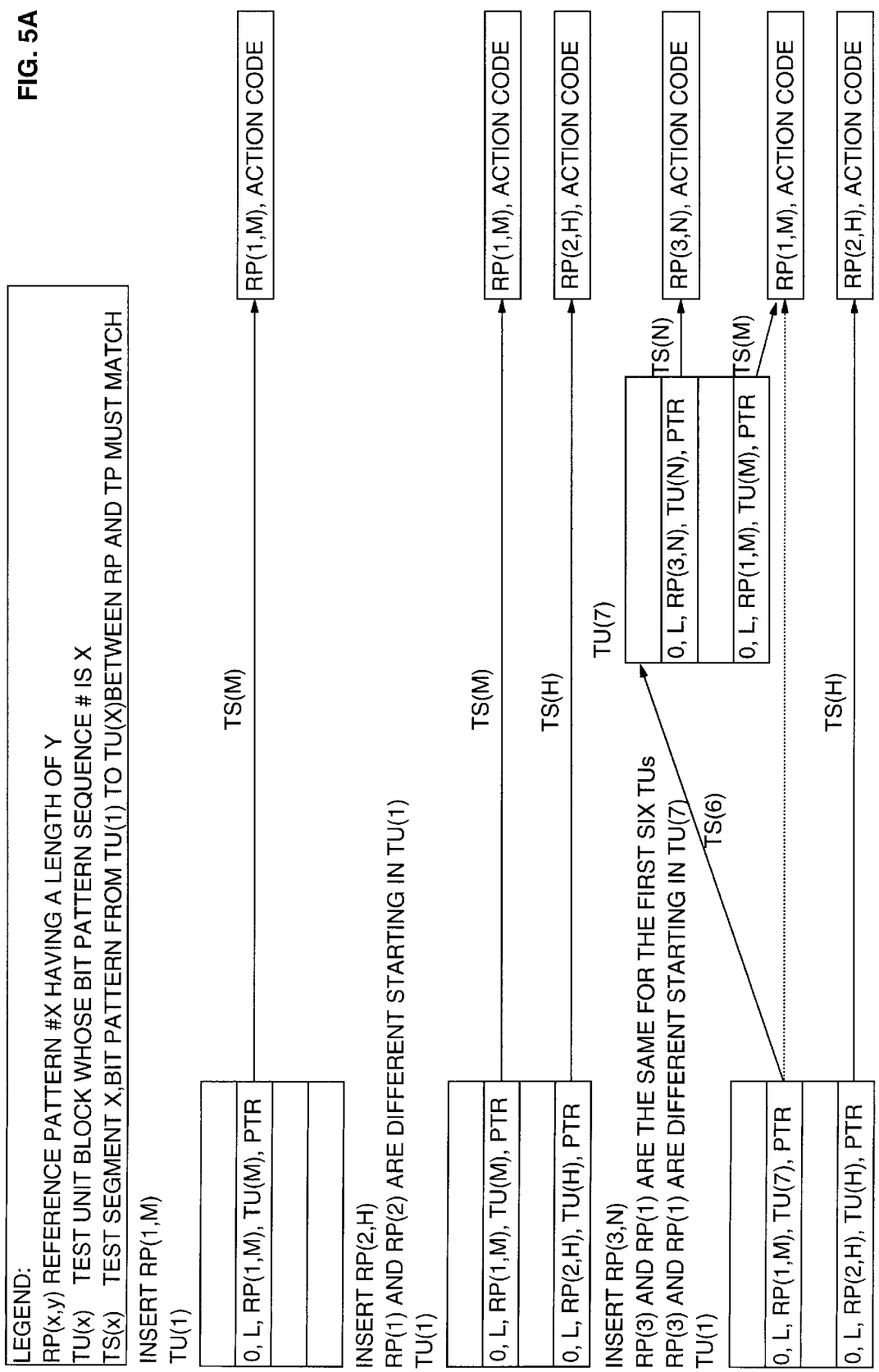
FIG. 5 is a pictorial depiction of several exemplary reference pattern insertions in accordance with the learning process illustrated in FIG. 4.

Referring now to FIG. 5, there is a pictorial illustration of several exemplary reference pattern insertions, according to the learning process shown in FIG. 4. When RP(1,m) arrives, it fetches the first TV, and then indicates that the RP "mapped" into an "empty" TV slot. The search for previous RP ends, the RP's action code descriptors are saved and a new TV is created, (TV=(0,L,RP(1,m), TU(m), RP-1 AC-ptr); RP-1 AC-ptr points to the AC location), and is saved into the TU(1) RP(1) location, say RP's TV(1) is "01."

When RP(2,h) arrives, again it is mapped into an empty TV slot in TU(1) after the first TV fetch. Again, the AC descriptors are saved, and a new TV is created and saved in its TU(1) TV slot, say "11" slot.

When RP(3,n) arrives, assuming that the RP(3,n) and the RP(1,m) have the bit patterns on their first 6 TUs, the TU(7) is the first TU that holds the different bit pattern between the two RPs. Obviously, when comparing RP(1,m) and RP(3,n) after the first TV, it indicates that the search ends at TU(1) without an RP match. In this case, several steps are taken to add RP(3,n) in the search path:

1. Save RP(3,n)'s AC descriptors.
2. Get a new TU block.
3. Find the first TU that can differentiate between the RP-1 and the RP-3. In this case, it is TU(7).
4. Copy TV(RP(1)) into the new TU location TU(RP(1, 7)), RP-1 TU(7) bit pattern as the decode.
5. Create a new TV for RP-3, TV=(0,L,RP(3,n), TU(n), RP-3 AC-ptr) and save unto the new TU location TU(RP(3,7)).
6. Link new TU into the search path by modifying the TV(RP(1,1)) TV (RP(1,1))=(0,0,RP(1,m),TU(7), "new TU(7)-ptr").

When RP(4,p) arrives, the RP-4 and the RP-1 differ at TU(5), and the search ends after the TV(RP(1,1)) comparison. Similar to inserting RP(3,n), the following steps are taken:

1. Save RP(4,n)'s AC descriptors.
2. Get a new TU block.
3. Find the first TU that can differentiate between the RP-1 and the RP-4. In this case, it is TU(5).
4. Copy TV(RP(1)) into the new TU location TU(RP(1, 5)), RP-1 TU(5) bit pattern as the decode.
5. Create a new TV for RP-4, TV=(0,L,RP(4,p), TU(n), RP-4 AC-ptr) and save into the new TU location TU(RP(4,5)).
6. Link the new TU into the search path by modifying the TV(RP(1,1)) TV(RP(1,1))=(0,0,RP(1,m), TU(5), "new TU(5)-ptr").

The RP-5 is a 9-bit pattern, the 9th bit is "1," and it is identical to the first 9 bits in the RP-1. When RP-5 arrives, it passes the TV(RP-5,1) test (TS(RP-1,4) =TS(RP-4,4)). The search continues. However, when processing the TV(RP-5,5, the search ends because the RP-5 exhausted its TUs. By examining the TV(RP-5,5, no M-flag that corresponds to the RP-5 was set. In other words, no RP-5 was matched during the search. Therefore, the following steps need to be taken to insert the RP-5 into the search path:

1. Save RP(5,5.1)'s AC descriptors.
2. Because RP-5 ends with "odd" TU(5) boundary, modify both TV(RP(5,5.1))s that correspond to the RP-5, in order to have the M-flag and the RP-5 AC pointer included. (If RP-5 has 10 bits, then only one of the TV(RP-5,5) needs to be modified.)

If an RP is exactly matched with the new-RP, then only the RP AC needs to be replaced.

Reference Pattern Deletion Process

Reference patterns (RPs) are deleted from the RP pool by a reference pattern deletion process. When a deletion RP (DRP) arrives, a Deletion process engine, first, searches for the RP pool for an exactly matched DRP. The deletion process will then remove the DRP and "clean up" the search path if the DRP is located in the RP pool. Otherwise, the reference pattern deletion process ends with no further action.

The last two TBs and their TV contents are saved during the DRP search and may be utilized in performing the DRP deletion. Abbreviations utilized for illustrating the deletion process are as follows:

TB(CTU#): Last (current) TB to be executed before ending the DRP search.
CTU#: TU number used as address decode for selecting the TV in TB(CTU#) during the search.
TB(PTU#): TB executed prior to the TB(CTU#).
PTU#: TU number used as address decode for selecting the TV in TB(PTU#) during the search.
TV(TU(DRP(CTU#))): TV in TB(CTU#) to be tested during DRP search.
TV(TU(DRP(PTU#))): TV in TB(PTU#) to be tested during DRP search.

Figure 6:
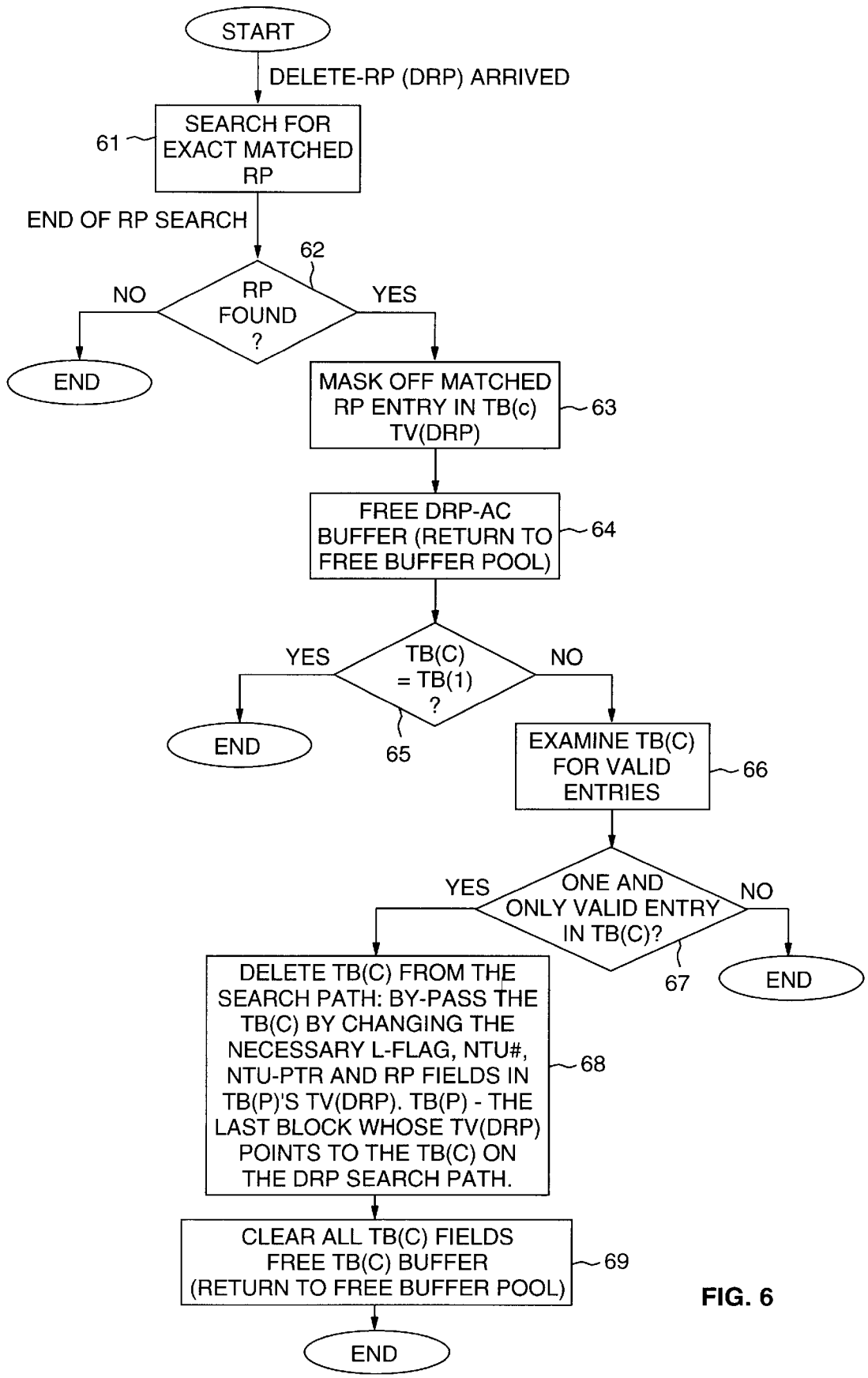
FIG. 6 is a high-level logic flow diagram of a method for deleting reference patterns from a search tree, according to a preferred embodiment of the present invention.

With reference now to FIG. 6, there is illustrated a high-level logic flow diagram of a method for deleting reference patterns from a search tree, according to a preferred embodiment of the present invention. After receiving an RP to be deleted (DRP), a search is made for an exactly matched RP in the RP pool, as shown in step 61 (an RP matching process is utilized to look for an exactly matched DRP). A determination is made as to whether or not a DRP is found, as depicted in step 62. The deletion process ends if no DRP is found.

However, if a DRP is found, the DRP entry in TV(TU (CTU#) in the TB(CTU#) (i.e., the last TB executed) is masked off, as illustrated in step 63. If the DRP is an M-flagged entry, then the M-flag in the TV is masked off. But, if the DRP is an L-flagged entry, then the L-flag, NTU#, RP-AC-ptr, RP in the TV are all masked off, without touching the M-flag field in the TV. Subsequently, in step 64, the DRP-AC buffer is returned to the free RP-AC buffer pool. This is accomplished by updating the last RP-AC buffer in the free pool to point to the DRP-AC buffer and by updating the AC buffer pool "tail" pointer register (equals to DRP-AC buffer location). Next, a determination is made as to whether TB(CTU#) is equal to TB(1), as shown in step 65. The deletion process ends if TB(CTU#) is equal to TB(1).

Otherwise, if TB(CTU#) is not equal to TB(1), the number of valid entries in TB(CTU#) is examined, as depicted in step 66. The examination includes a reading, examining, and counting of the valid entries in all TVs in the TB(CTU#). M-flagged entries, L-flagged entries, and search nodes (entries utilized for signalling the continuation of the search) are all valid entries. In step 67, a determination is made as to whether or not there is only one valid entry existing in TB(CTU#). The deletion process ends when there exists more than one valid entry. If there is only one valid entry, as shown in step 68, the search path is re-routed to remove TB(CTU#) by:

1. Extracting RP information from TB(CTU#).
   If RP is M-flagged: NL(RP)=M(RP); NNTU#=TU(k); NNTU-ptr=MRP-AC-PTR; NRP=(RP(TU(PTU#))+ (M(RP))),
   where (RP(TU(PTU#)+(M(RP))=RP in TV(TU(DRP (PTU#))) with TU(k) bits replaced by M(RP).
   Otherwise, NL(RP) =L(RP); NNTU# =NTU#; NNTU-ptr=NTU-ptr; NRP=RP.
2. Modifying TV(TU(DRP(PTU#))=(xx, NL(RP), NNTU#, NNTU-ptr, NRP) (Re-route the TB(PTU#) to remove TB(CTU#) from the search path.)

Finally, in step 69, the deleted TB(CTU#) is returned to the free TB pool by updating the last TB in the free pool to point to the TB(CTU#) and by updating the TB pool "tail" pointer register (to equal to TB(CTU#) location). This concludes the deletion process.

Figure 7A:
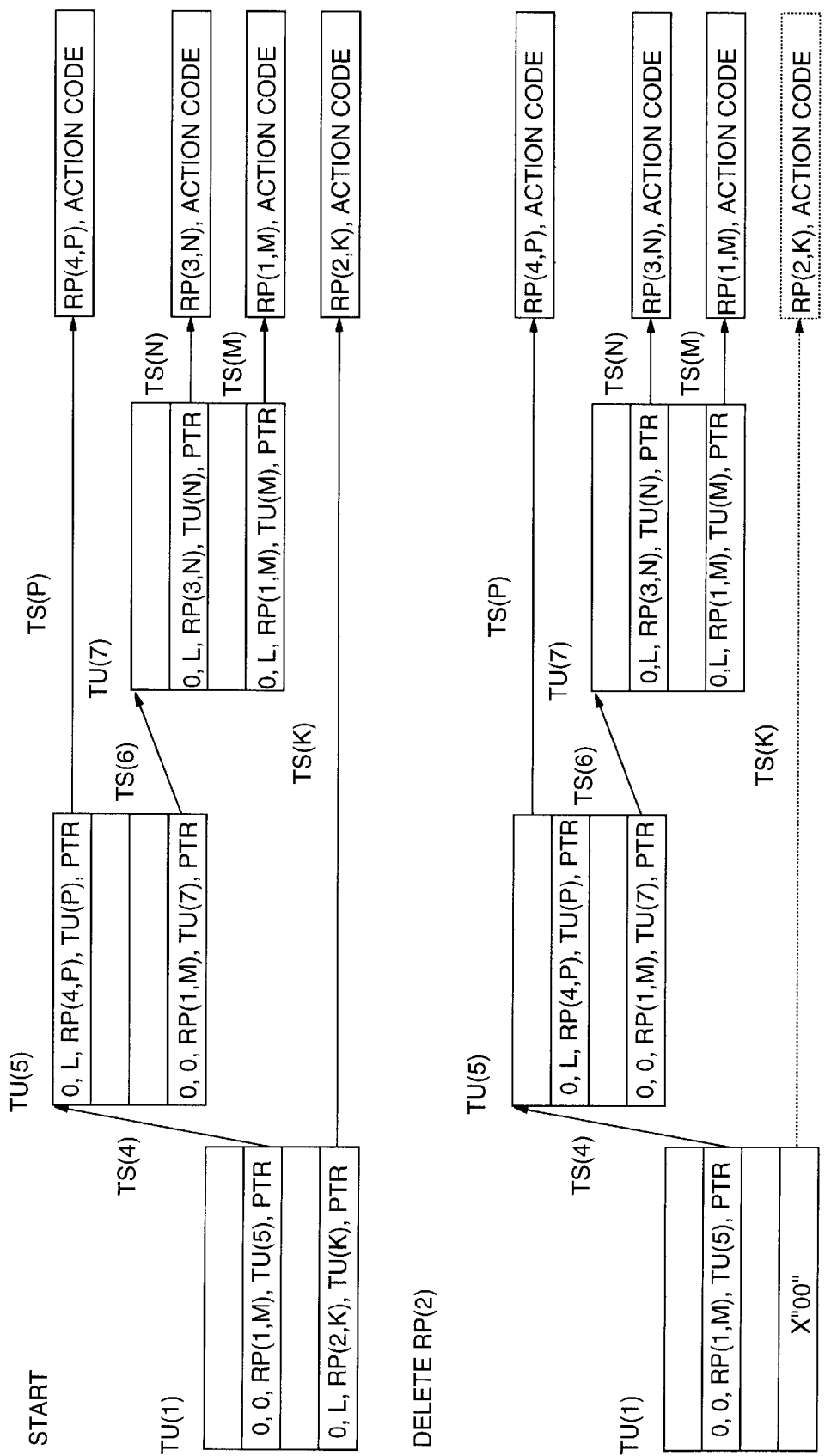
FIG. 7 is a pictorial depiction of two exemplary reference pattern deletions in accordance with the deletion process illustrated in FIG. 6.
Figure 7B:
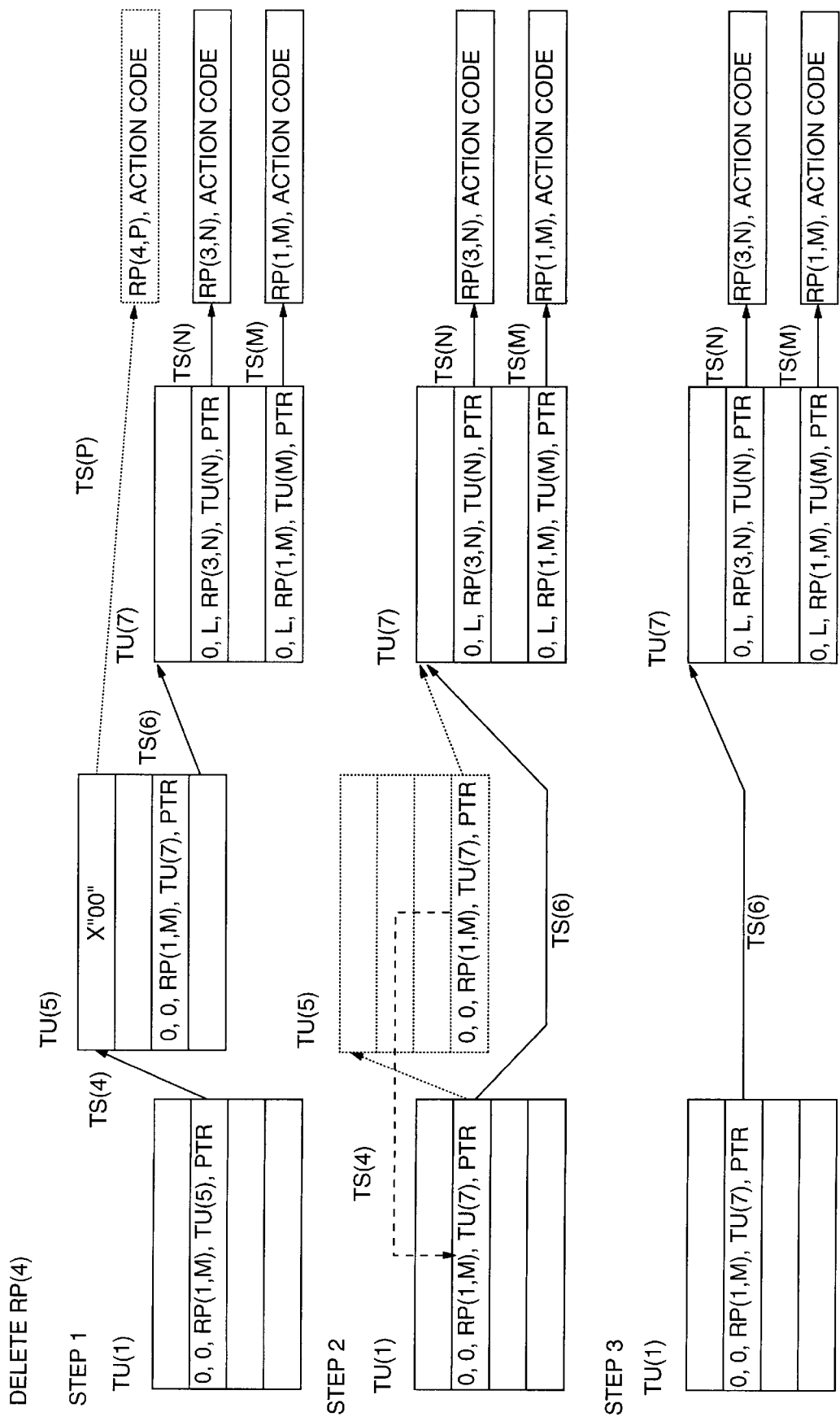

Referring now to FIG. 7, there is a pictorial depiction of two exemplary reference pattern deletions, according to the deletion process illustrated in FIG. 6. As shown, there are four reference patterns in a search tree. The second Reference Pattern (RP2) may be deleted from the search tree as follows:

1. search for RP2 (RP2 is located in TU(1));
2. mask off the TV of RP2 in TB(1);
3. return RP2 AC buffer to a free TU pool;
4. end of deletion.

Similarly, the forth Reference Pattern (RP4) may be deleted from the search tree as follows:

1. search for RP4 (RP4 is located in TU(5));
2. mask off the TV of RP4 in TB(5);
3. return RP2 AC buffer to the free TU pool;
4. examine TU(5) for valid entries (only one valid entry (RP1) in TU(5));
5. modify the TV of RP4 in TU(1) to re-route search path (points to TU(7));
6. return TU(5) to the free TU pool;
7. end of deletion.

Reference Patterns Matching Process

Figure 8:
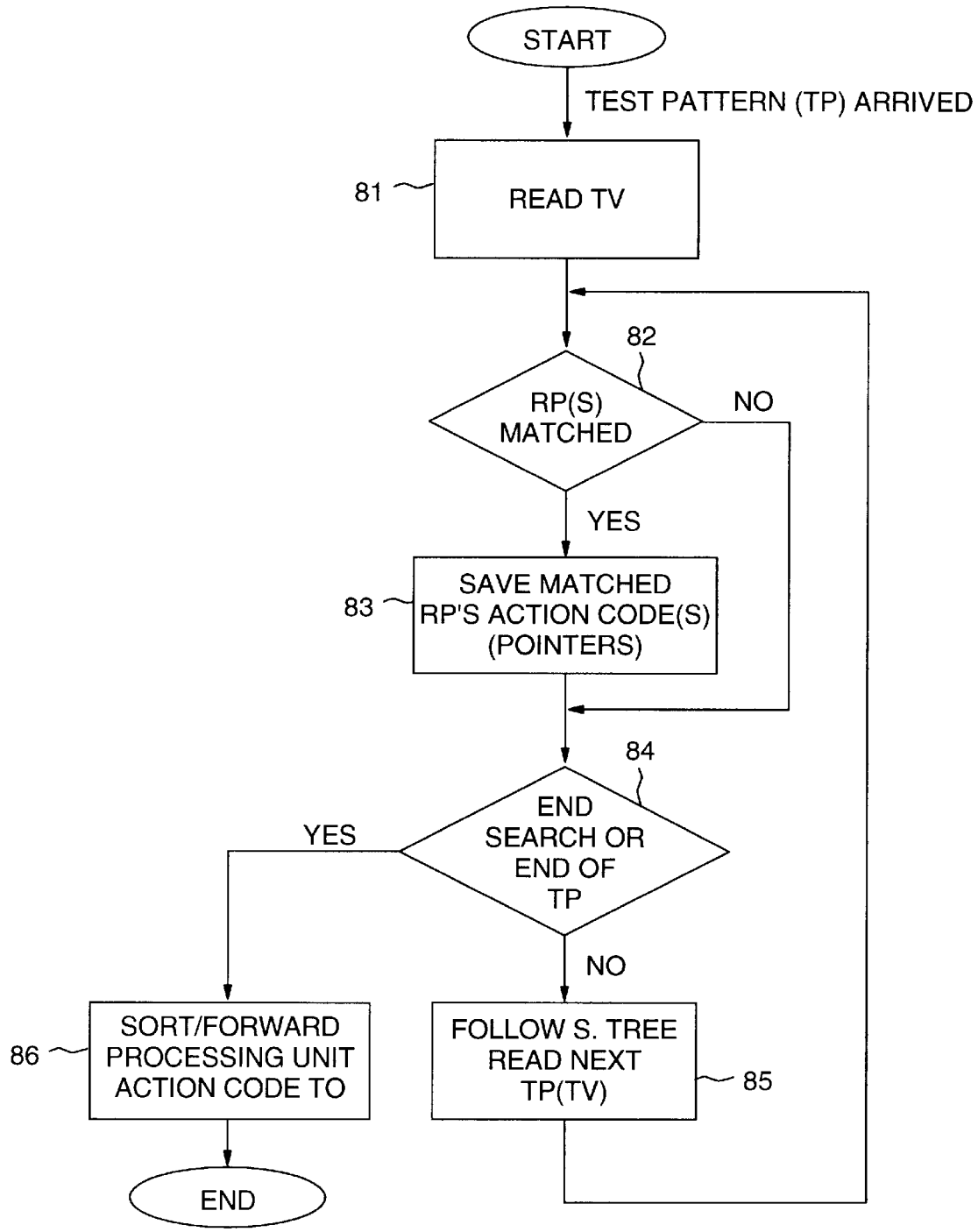
FIG. 8 is a high-level logic flow diagram of a method for matching reference patterns in a search tree, according to a preferred embodiment of the present invention.

With reference now to FIG. 8, there is illustrated a high-level logic flow diagram of a method for matching reference patterns in a search tree, according to a preferred embodiment of the present invention. In step 81, the first TU of the TP (i.e., the received address) is utilized as the decode to read the TV in the first TB at a pre-determined location. Because different protocols start on different search trees, the pre-determined starting location depends on the protocol of the received address. Then, the TV is examined for possible matched RP(s), as shown in step 82. A matched RP can be:

1. M-flag, or
2. L flag+TP & RP's TS(NTU#) bit patterns exactly matched, where TS(NTU#) =(bit pattern from TU(1) up to TU(NTU#))

If a matched RP exists, all the matched RP information and their action code pointers (ie., M, L, Mx AC ptr) are recorded (or saved) sequentially, as depicted in step 83.

In step 84, a determination is made as to whether or not a search for another RP should be continued. If (TU(TP)>= NTU#>CTU#) and (TP(TS(NTU#−1))=RP(TS(NTU#−1))) and no L-flag; then the process proceeds to step 85. (TP(TS (x))=RP(TS(x)): Bit pattern from TU(1) to TU(x) matched between TP and RP). In step 85, a next TB's TV is read, TB pointer=N-TU-ptr, TV offset=TP's (TU(N-TU#) bit pattern decode, and the process returns back to step 82.

Otherwise, a search for another RP should not be continued because it is the end of the search tree. It is the end of a search tree when:

1. (TU(TP) or NTU#) is less than or equal to CTU#, or
2. NTU# is greater than TU(TP) TU(TP)=TP pattern length), or
3. L flagged entry is reached, or
4. Bit patterns from TU(1) to TU(NTU#−1) between the TP and the RP are NOT matched, or
5. Illegal state.

In step 86, the RP action code is sort/forward to a Frame-Processing Engine, and this completes the RP matching process.

High Performance Switch Router

Figure 9:
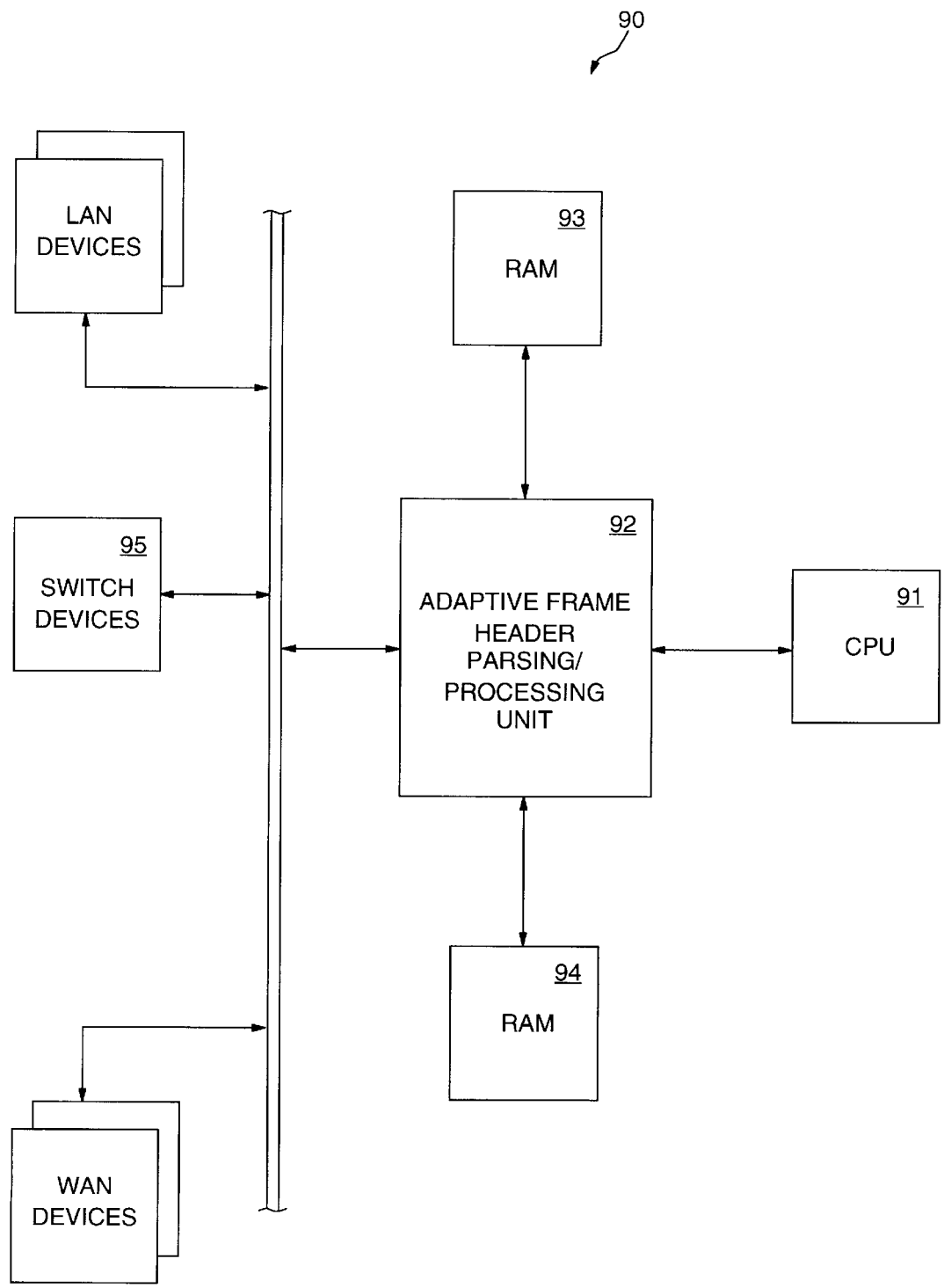
FIG. 9 is a block diagram of a high performance switch router in which a preferred embodiment of the present invention may be utilized.

Referring now to FIG. 9, there is illustrated a block diagram of a high performance switch router in which a preferred embodiment of the present invention may be utilized. As shown, switch router 90 includes a central processing unit (CPU) 91, an adaptive frame header parsing/processing unit (AFPU) 92, a first bank of random access memory (RAM) 93, a second bank of RAM 94, and switch devices 95.

CPU 91 controls all standard operations within switch router 90 as well as managing any protocol related processing and setting up frame forwarding tables. AFPU 92 learns each reference pattern presented by CPU 91 and then parses a frame header of the reference pattern in accordance with a preferred method as discussed above. AFPU 92 utilizes the parsing results for frame filtering, forwarding, and for frame modification before re-transmission. All incoming data frames can be buffered in either a First-In-First-Out buffer within AFPU 92 or one of RAMs 93, 94, and wait for the processing to complete before re-transmission. For enhancing system performance and pipelining design, two RAMs—RAM 93 and RAM 94—are utilized in switch router 90. Both RAMs 93, 94 are managed by AFPU 92. Frame forwarding address tables and pointers are stored in one of RAMs 93, 94 while the frame processing descriptors and the buffered received frames are stored in the other. Switch devices 95 such as LAN/WAN/ATM controllers, are utilized to feed frames to and from AFPU 92 for frame forwarding processing.

As has been described, the present invention discloses an improved method of parsing frame headers for routing data frames within a computer network. The disclosed method utilizes a search tree structure and a bit- pattern-matching technique for parsing frame headers. The parsing method under the present invention has three unique properties. First, it is guaranteed that there is a unique search path for each of the reference patterns learned. Second, the search tree can record reference patterns of variable bit lengths. Third, multiple reference patterns that vary in lengths and hold the same bit patterns are marked accordingly within a search path before the search ends.

While the invention has been particularly shown and described with reference to a preferred embodiment, it will be understood by those skilled in the art that various changes in form and detail may be made therein without departing from the spirit and scope of the invention.

What is claimed is:

1. A method of parsing frame headers for routing data frames within a computer network, said method comprising the steps of:

receiving a data frame from said computer network;

parsing a frame header of said data frame into a plurality of test units, wherein all said test units have an identical length;

assigning a test vector to each of said plurality of test units, wherein each said test vector includes a reference pattern field and an action code pointer field;

constructing a plurality of test blocks by inserting each said test vector to a corresponding slot of one of said plurality of test blocks; and constructing a search tree utilizing said plurality of test blocks, wherein said plurality of test blocks are associated with each other by said test vectors.

2. The method of parsing frame headers for routing data frames within a computer network according to claim 1, wherein said parsing step further includes a step of parsing said frame header into a plurality of two-bit test units.

3. The method of parsing frame headers for routing data frames within a computer network according to claim 1, wherein said assigning step further includes a step of assigning a test vector in accordance with a bit pattern with each of said test units.

4. The method of parsing frame headers for routing data frames within a computer network according to claim 1, wherein said inserting step further includes a step of inserting a test vector to a corresponding slot of a test block from a number selection of slots limited by a size of each said test units.

5. The method of parsing frame headers for routing data frames within a computer network according to claim 1, wherein said step of constructing a search tree further includes a step of constructing a separate search tree for a received data frame having a different communication protocol.

6. The method of parsing frame headers for routing data frames within a computer network according to claim 1, wherein said method further includes a step of routing said data frame to a node within said computer network in accordance with an action code in said action code field within one of said plurality of test vectors having a reference pattern in said reference pattern field matched with said frame header.

7. A data processing system for routing data frames within a computer network, said data processing system comprising:

means for receiving a data frame from said computer network;

means for parsing a frame header of said data frame into a plurality of test units, wherein all said test units have an identical length;

means for assigning a test vector to each of said plurality of test units, wherein each said test vector includes a reference pattern field and an action code pointer field;

a plurality of test blocks, wherein each of said test blocks includes a plurality of slots, wherein some of said plurality of slots contains one of said test vectors; and a search tree constructed by said plurality of test blocks, wherein said plurality of test blocks are associated with each other by said test vectors.

8. The data processing system for routing data frames within a computer network according to claim 7, wherein each of said plurality test units is two-bit long.

9. The data processing system for routing data frames within a computer network according to claim 7, wherein said assigning means further includes a means for assigning a test vector in accordance with a bit pattern with each of said test units.

10. The data processing system for routing data frames within a computer network according to claim 7, wherein said test vector is inserted to a corresponding slot of a test block from a number selection of slots limited by a size of each said test units.

11. The data processing system for routing data frames within a computer network according to claim 7, wherein said data processing system further includes a separate search tree for a received data frame having a different communication protocol.

12. The data processing system for routing data frames within a computer network according to claim 7, wherein said data processing system further includes a means for routing said data frame to a node within said computer network in accordance with an action code stored in said action code field within one of said plurality of test vectors having a reference pattern stored in said reference pattern field matched with said frame header.

* * * * *